United States Patent [19]
Florian

[11] B 3,989,158
[45] Nov. 2, 1976

[54] SELF-DRAINING SAUCER
[75] Inventor: John Florian, Bakersfield, Calif.
[73] Assignee: Mobil Oil Corporation, New York, N.Y.
[22] Filed: Dec. 3, 1974
[21] Appl. No.: 529,156
[44] Published under the second Trial Voluntary Protest Program on January 13, 1976 as document No. B 529,156.

[52] U.S. Cl. .............................. 220/23.83; 220/90.4
[51] Int. Cl.² ......................................... A47G 19/00
[58] Field of Search ............... 220/68, 13, 4 C, 20.5, 220/23.83, 23.86, 85 H, 90.4; 215/100.5

[56] References Cited
UNITED STATES PATENTS

| | | | |
|---|---|---|---|
| 2,650,485 | 9/1953 | La Greca | 220/23.83 |
| 3,018,014 | 1/1962 | Opolion | 220/23.83 X |
| 3,037,660 | 6/1962 | Roehrig | 220/23.83 |

*Primary Examiner*—William Price
*Assistant Examiner*—Steven M. Pollard
*Attorney, Agent, or Firm*—Charles A. Huggett; James D. Tierney

[57] ABSTRACT

A self-draining saucer is provided by combination of two concave discs (saucer shape). The lower disc has a central well defined by a depressed central bottom and circular wall. The upper disc is formed such that its bottom convex surface generally follows the concave upper surface of the lower disc. A vertical surface on the under side of the upper disc frictionally engages a similar surface inside the lower disc to retain the pair. Holes are provided through the top disc above the well in the lower disc for drainage of spilled liquid into the well. The combination is easily formed of thermoplastic resin and assembled on standard thermoforming machinery.

3 Claims, 7 Drawing Figures

U.S. Patent  Nov. 2, 1976  3,989,158
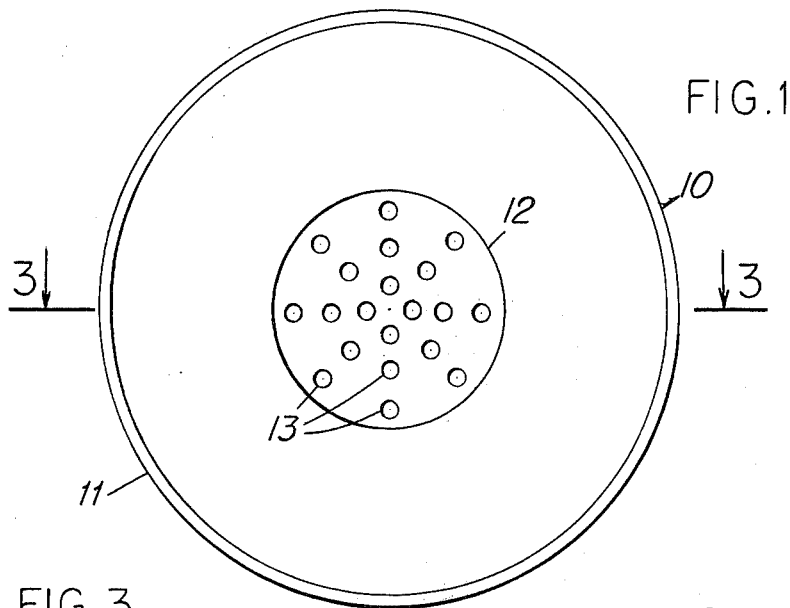
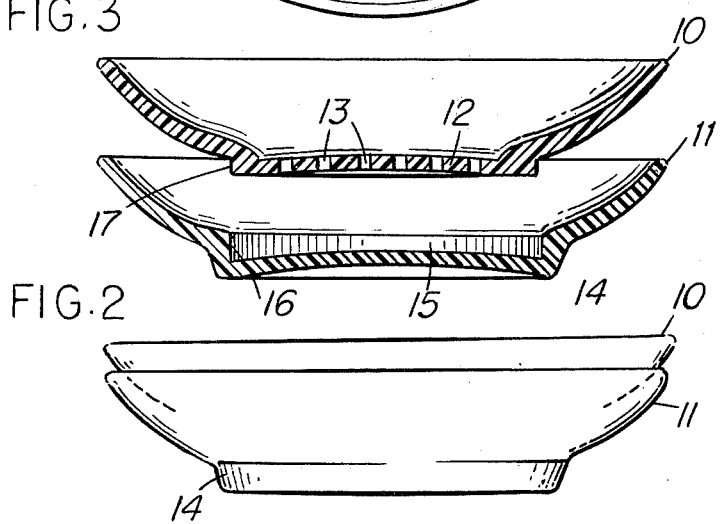
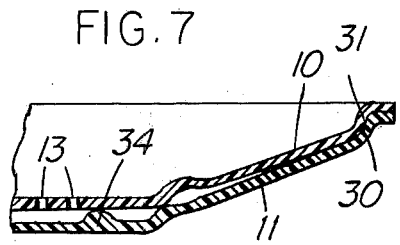
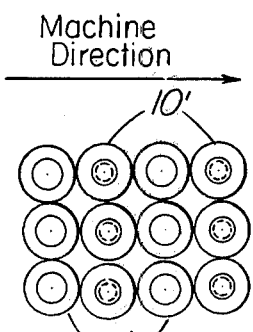
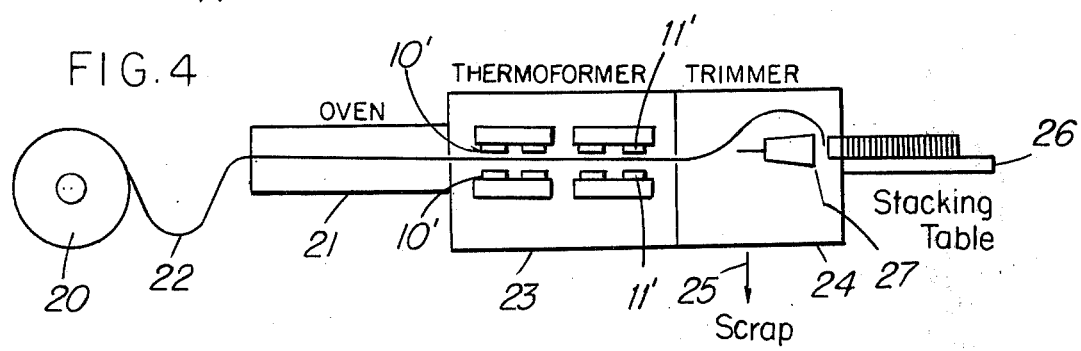
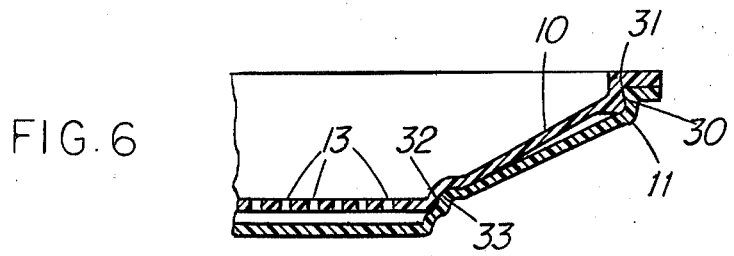

SELF-DRAINING SAUCER

BACKGROUND OF THE INVENTION

The problem of spilled liquid from a cup of coffee, soup or other comestible liquid is a common experience. The liquid spilled into a saucer wets the under surface of the cup and is transferred to the clothing of the consumer when the cup or the like is lifted from the saucer.

One solution often employed is a circular doily of absorbent material such as felted fibers placed in the saucer. In some food service establishments, the absorbent doily replaces the saucer by placing such a doily on a counter or table and placing the cup thereon. In either case, spillage results in an unsightly stained and soggy doily.

SUMMARY OF THE INVENTION

These problems are obviated by a disposable self-draining saucer which transfers liquid spilled thereon to an internal well, providing an upper surface free of a pool of liquid. These are advantageously thermoformed of thermoplastic, preferably foamed polystyrene, on presently available thermoformers.

The saucer of this invention is a friction fitted combination of two discs of the desired diameter, preferably upwardly concave in the manner usual for such dishes. The lower disc is characterized by a central well defined by a bottom depressed below the contour of the upper concave surface and a circular wall thereabout. The central area of the upper disc has a series of holes therethrough and a bottom circular flange surrounding the holes. The circular flange is proportioned to make a secure friction fit with the circular wall of the well in the bottom disc.

In some embodiments, the friction fit is accomplished between matching circular walls other than that defining the well, e.g. at the periphery of the combination.

The self-draining saucer is adapted for forming of the discs and assembly of the finished product on standard machinery for thermoforming and stacking of thermoformed products. To accomplish this result, the molds of the thermoformer are designed to draw the resin sheet fed to the machine in a plurality of discs with a mold for the lower disc following, in the machine direction (MD) a mold for the upper disc. The trim dies which cut the elements from the sheet may be identical with each other in the preferred form of the invention characterized by upper and lower discs of the same diameter.

As these elements are turned on edge and advanced to the stacker, the upper and lower discs will be in alignment for engagement of the circular flange on the bottom of the upper disc with the circular wall of the well, or other friction-fitting walls. The pressure in the stacker is generally sufficient to press the two adjacent elements into fitted relation, completing the combination. If not, mild manual pressure against a stack so prepared will result in engagement.

The advantages of the invention will become apparent from description below of preferred embodiments when considered with the annexed drawings.

BRIEF DESCRIPTION OF THE DRAWINGS

In the annexed drawings,

FIG. 1 is a plan view of a self-draining saucer according to this invention;

FIG. 2 is an elevation of the saucer shown in FIG. 1;

FIG. 3 is an exploded view of a section on line 3—3 of FIG. 1;

FIG. 4 is a diagrammatic representation of forming and assembly line for practice of the invention;

FIG. 5 is an illustration of pattern of thermoforming molds according to the invention;

FIG. 6 is a half section of a further embodiment of the invention; and

FIG. 7 is a similar half section of still a third embodiment of the invention.

DESCRIPTION OF PREFERRED EMBODIMENTS

The appearance of the saucer of this invention is shown in FIGS. 1 and 2 as the combination of an upper concave disc 10 and a lower concave disc 11 which fits snugly to the under side of disc 10. Preferably, the upper disc 10 has a slightly depressed central portion 12 which acts to retain a cup centered in the manner usual with saucers. A plurality of holes 13 are pierced through the depressed central portion 12 for purposes of draining spilled liquid from the upper concave face of the combination saucer. Preferably, the lower disc 11 has a circular flat bottom foot 14, also generally similar to previously used saucers of china or the like. As will be seen from the drawings, the two discs are of substantially equal diameter.

Referring now to FIG. 3, the nature of the structure is illustrated by an exploded section along a diameter of the saucer. A well 15 in bottom disc 11 has a circular wall 16. A circular outer wall 17 surrounds the under side of upper disc 10 about the depressed portion 12 pierced by holes 13. Wall 17 has an outside diameter substantially equal to the inside diameter of well 15. It will be seen that when upper disc 10 is pressed down on lower disc 11, wall 17 enters well 15 with the wall 17 in frictional engagement against circular wall 16 to retain the combination in secure engagement.

It will be seen that engagement of upper disc 10 and lower disc 11 provides a reservoir defined by the bottom of well 15 and the under surface of central portion 12 which receives and retains liquid that drains from the top of the saucer through holes 13. The holes 13 should be of a size to facilitate drainage without impedence by capillary effects. The holes 13 should be at least ⅛ inch in diameter, preferably about 3/16 inch. It will be apparent that the reservoir may be filled with absorbent material to avoid leakage during disposal. This is generally a problem of no real importance. Since insertion of absorbent material requires an additional operation in manufacture, it is preferred to leave the reservoir free of added material.

An automatic system for forming the separate elements and assembling the saucers is shown diagrammatically in elevation by FIG. 4, each of the operative stages being a conventional machine. The departure from prior practice is the pattern of thermoforming molds, illustrated in FIG. 5.

Although clear thermoplastic sheet may be employed, the preferred material is foamed polystyrene. As shown in FIG. 4, a roll of polystyrene foam is positioned at 20. The sheet of foam is continuously supplied to tunnel oven 21, a loop 22 being formed to accomodate the intermittent movement through the thermoformer 23 and trimmer 24.

In oven 21, the sheet of foam is subjected to radiant heat which brings the sheet to a temperature suitable for thermoforming. The now ductile sheet passes to thermoformer 23 where its forward motion is interrupted while cooled matching molds are impressed on the sheet to draw the foam to the desired shape shown in FIGS. 1, 2 and 3. Advantageously, the molds are such that successive formed elements are top disc 10 followed by bottom disc 11. A mold pattern for this purpose is indicated in FIG. 5 where 10' and 11' designate molds for forming top disc 10 and bottom disc 11, respectively. That arrangement is indicated diagrammatically in FIG. 4 as upper and lower multiple dies. The sheet drawn to the desired forms passes to trimmer 24 where a single trim die 27 in register with the molds of thermoformer 23 cuts away the excess foam from the formed parts to be withdrawn as scrap for recycle at 25.

The formed parts (alternate discs 10 and 11) free of the sheet are now stacked on a stacking table in order of their discharge from trimmer 24. The pressure of the stacking ram is generally adequate for engagement of each disc 10 with the following disc 11. However, engagement can be assured by mild manual pressure to each stack removed by the operator for packaging.

The alternative forms shown by half sections in FIGS. 6 and 7 embody the principles of the invention in structures having different frictional engagement than that shown in FIG. 3. Each of FIGS. 6 and 7 represents sections along one half of a diameter of an assembled saucer. In each the principal engagement is between an inwardly facing wall 30 of the lower disc 11 with an outwardly facing wall 31 of the upper disc 10, each of walls 30 and 31 being concentric with the axis of the saucer. The walls 30 and 31 are near the outer edges of the discs 10 and 11 as shown.

In the embodiment of FIG. 6, additional engaging walls 32 and 33 are provided near the bottom of the combination saucer for additional security of the assembled saucer.

Means for preserving depth of the well are illustrated in FIG. 7 as nodes 34 formed in the bottom of the well of disc 11.

I claim:

1. A self-draining saucer or the like composed of two discs of like upwardly concave shape 1 of substantially equal diameter and coacting to form a unitary structure having an internal reservoir to receive liquid and means to drain liquid from the upper surface thereof into said reservoir, said saucer comprising the combination of:
   a. an upper disc having a concentric wall on the bottom surface thereof and at least one perforation through the bottom of said disc; and
   b. a lower disc having a circular concentric well defined by a bottom surface spaced downwardly from the concave surface of said lower disc and a circular wall on the upper face of said lower disc, said circular wall having an internal diameter substantially equal to the external diameter of said wall on the bottom of said upper disc and adapted to engage therewith, whereby the frictional engagement of said circular walls retains the combination.

2. A saucer according to claim 1 composed of thermoformed polystyrene foam.

3. An article of manufacture according to claim 1 having nodes on the under side of the upper disc adapted to contact the upper surface of the lower disc and thereby maintain a predetermined depth of said internal reservoir.

* * * * *